United States Patent [19]

Herschberger

[11] Patent Number: 4,484,374

[45] Date of Patent: Nov. 27, 1984

[54] APPARATUS FOR STUFFING GROUND MEAT INTO CASINGS

[76] Inventor: Melvin Herschberger, Box 453, Kalona, Iowa 52247

[21] Appl. No.: 358,704

[22] Filed: Mar. 16, 1982

[51] Int. Cl.³ ............................................. A22C 11/08
[52] U.S. Cl. ......................................................... 17/37
[58] Field of Search .................. 17/37, 41, 42, 49, 36, 17/33

[56] References Cited

U.S. PATENT DOCUMENTS

| 27,196 | 2/1860 | Atkins | 17/37 |
| 872,231 | 11/1907 | Hambruch | 17/37 |
| 1,043,241 | 11/1912 | Louden, Sr. | 17/41 |
| 1,133,030 | 3/1915 | Hottmann | 17/37 |
| 1,510,063 | 9/1924 | Kertes | 17/33 |
| 2,021,831 | 11/1935 | Brightbill | 17/35 |
| 2,325,446 | 7/1943 | Walter | 17/41 |
| 2,837,762 | 6/1958 | Azzini | 17/37 |
| 2,953,812 | 9/1960 | Anderson | 17/37 |
| 2,963,735 | 12/1960 | Gaudlitz | 17/37 |
| 4,313,240 | 2/1982 | Righele et al. | 17/37 |

FOREIGN PATENT DOCUMENTS

| 29207 | 10/1884 | Fed. Rep. of Germany | 17/37 |
| 2696 | 9/1890 | Switzerland | 17/37 |

Primary Examiner—Willie G. Abercrombie
Attorney, Agent, or Firm—James C. Nemmers

[57] ABSTRACT

An apparatus for stuffing ground meat into casings so as to form links. The apparatus has a metering pump for the ground meat, which pump includes an impeller combined with a movable, adjustable vane that controls the volume of meat fed into the stuffing horn for introduction into the casing. The stuffing horn has ribs along its length which ribs make it easier to slip the casing onto the horn and prevent the casing from slipping when the horn is turned to twist the casing and form the links.

8 Claims, 6 Drawing Figures

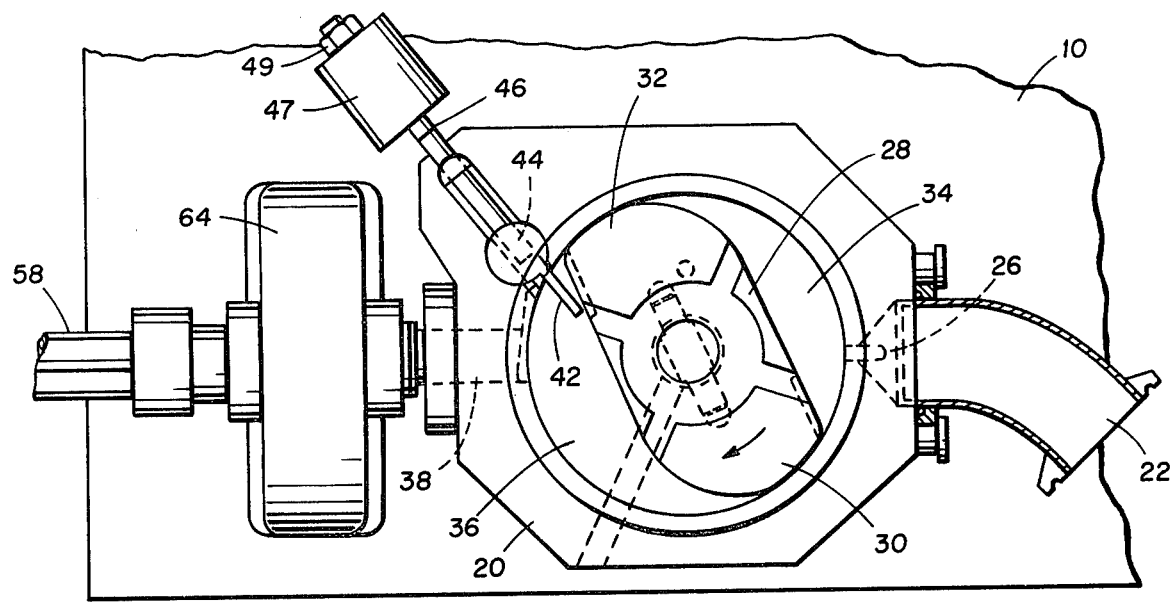
FIG 3
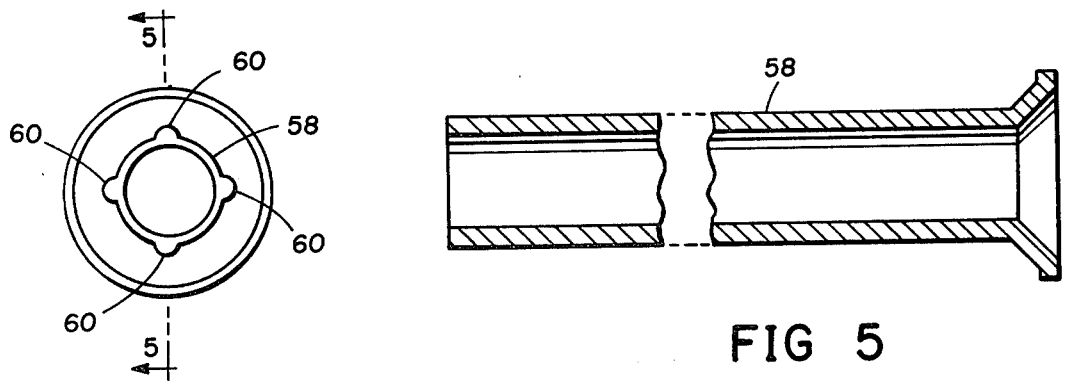
FIG 4
FIG 5
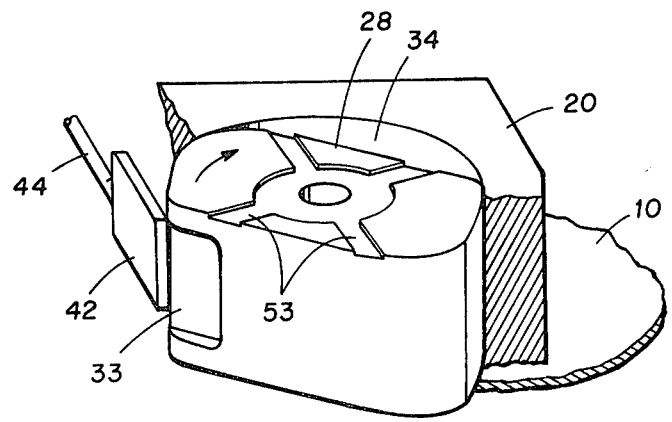
FIG 6

APPARATUS FOR STUFFING GROUND MEAT INTO CASINGS

BACKGROUND OF THE INVENTION

There are known and commercially available a variety of machines for stuffing ground meat into a casing. Such machines usually have a hopper from which the meat is fed continuously into a casing after which the casing is twisted or tied to form links. The known and commercially available machines of this type are relatively complex and quite expensive so that the small meat or sausage producer usually cannot justify the necessary expenditure for such machines. Particularly, the machines that operate under a vacuum in order to withdraw air from the meat are expensive while the less expensive machines that do not use vacuum leave an undesirable amount of air in the meat thus lessening its shelf life.

Moreover, the machines that both stuff and link are extremely expensive. Thus, many meat processors use a simpler machine that stuffs the entire rope, and the links are then formed on a separate linking machine. Also, with the stuffer-linker machines, rather elaborate mechanisms are employed to prevent the casing from slipping on the stuffing horn while the links are formed. Slippage is a problem especially with artificial casings, and therefore very close tolerances must be maintained in the manufacture of the stuffing horn further adding to the cost of the machine.

It is therefore an object of the invention to provide a simple inexpensive stuffing machine that will permit the maximum amount of air to be removed from the meat during the entire stuffing process.

It is a further object of the invention to provide an improved metering device that permits an accurate and controlled amount of meat to be fed into the casing producing links that are consistently accurate in their size and weight.

It is a further object of the invention to provide an improved meat stuffing machine having a relatively inexpensive stuffing horn that easily and simply handles all types of casings without the necessity of using an additional mechanism to twist the casing. This permits the stuffing machine to also serve as a semi-automatic linking machine.

SUMMARY OF THE INVENTION

The meat stuffing machine of the invention includes a metering pump for the ground meat that has an impeller combined with a movable adjustable vane that permits accurate control of the volume of the meat fed into the stuffing horn. The movable plate permits easy adjustment to vary the amount of meat metered from the pump thus permitting easy variation of the size and weight of the links produced. A vacuum is applied to the metering pump to withdraw excess air from the meat as it is metered. The machine also includes a stuffing horn that utilizes a ribbed tube that allows the horn to grip the casing so that the casing can be easily twisted, either manually or automatically, as the links are formed.

BRIEF DESCRIPTION OF THE DRAWINGS

FIG. 3 is a top or plan view of the portion of the machine shown in FIGS. 1 and 2 with portions of the apparatus cut away to further illustrate the metering pump;

FIG. 4 is an end view of the stuffing horn;

FIG. 5 is a sectional view taken on the line 5—5 of FIG. 4; and

FIG. 6 is a perspective view of the rotor of the metering pump.

DESCRIPTION OF THE PREFERRED EMBODIMENT OF THE INVENTION

Figure 1:
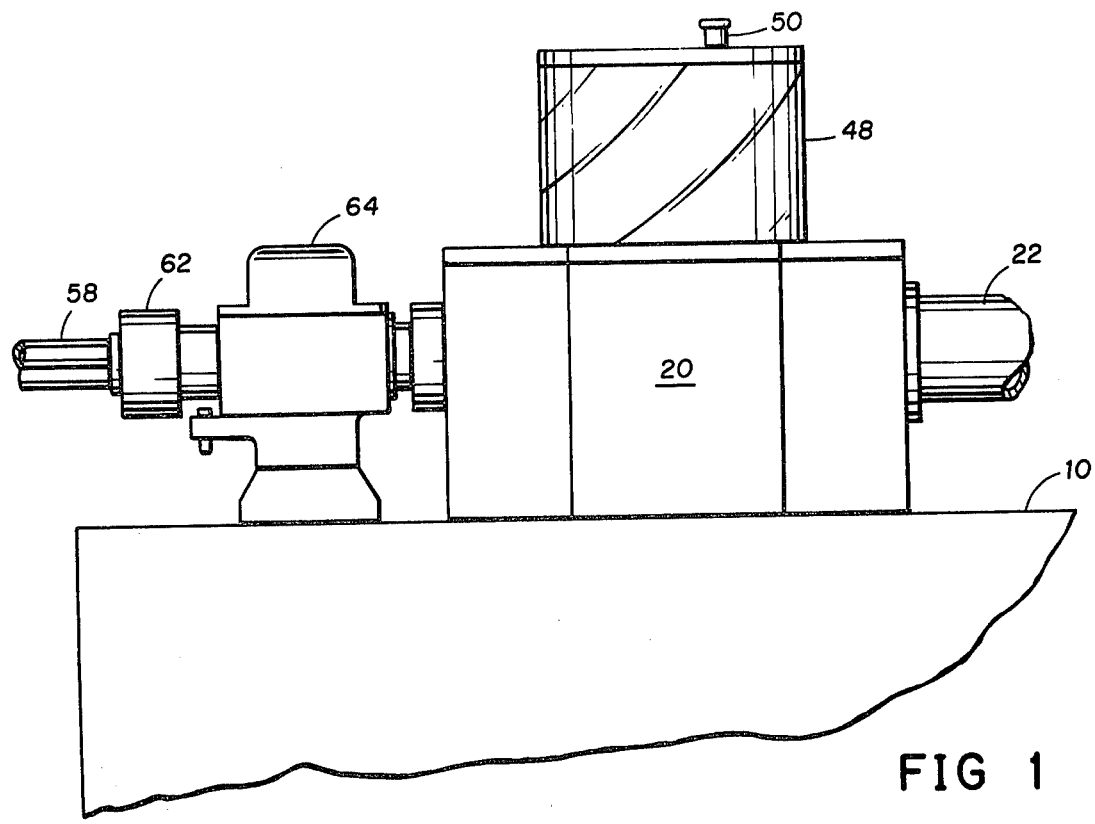
FIG. 1 is a side elevational view of a portion of a machine constructed according to the invention illustrating the metering pump and stuffing horn.
Figure 2:
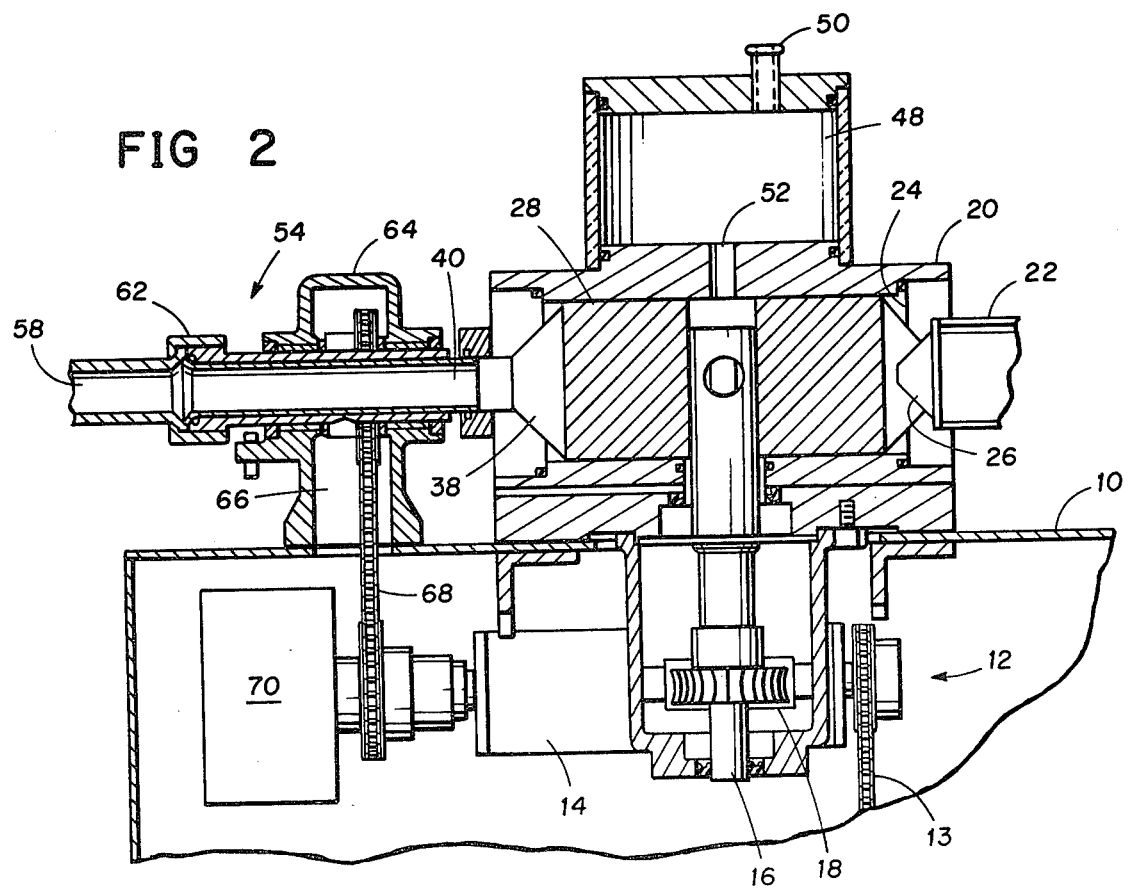
FIG. 2 is a sectional view of that portion of the machine of FIG. 1 and further illustrating the details of the metering pump and stuffing horn.

The drawings illustrate a stuffing machine that incorporates the principles of the invention. Most of the details of the drive components of the machine are omitted since these are not unique and are obvious to those skilled in the art.

The machine has a base 10 that encloses the machine's drive components which are indicated generally by the reference numeral 12. The drive components include a power means such as an electric motor (not shown) that drives a chain 13 which powers a vertical drive shaft 16 through a gear arrangement 18.

Drive shaft 16 extends vertically into a metering pump housing 20 mounted on top of base 10. Housing 20 has an inlet duct 22 that is connected to a line (not shown) supplying the ground meat that is to be stuffed into a casing. A chamber 24 is formed inside of housing 20 which chamber 24 is connected through a reduced passageway or slot 26 to the inlet duct 22. A rotor 28 is operatively connected to drive shaft 16 for rotatable movement inside of chamber 24. Rotor 28 has two lobes 30 and 32, the outer surfaces of which are formed to conform to the interior surface of chamber 24 so that the interior surface or wall of chamber 24 is scraped clean of any meat in chamber 24 as the rotor 28 rotates. Each of the lobes 30 and 32 also has a pocket 33 (FIG. 6) formed in its outer surface to trap air as the meat is compacted in the chamber 24 as rotor 28 rotates.

Because of the lobes 30 and 32 of rotor 28, smaller chambers 34 and 36 are formed between the rotor 28 and the interior wall of chamber 24. These chambers 30 and 34 are of a predetermined size that is determined by the maximum size of the sausage link that is to be formed.

Formed in the side of housing 20 opposite the inlet duct 22 is an outlet passageway 38 which leads to a carrier tube 40. In order to vary the amount of meat metered by chambers 34 and 36, a wiper blade 42 extends inside of chamber 36 just beyond outlet passageway 38. Thus, with the rotor 28 rotating clockwise (FIG. 3) the wiper blade 42 will engage the lobes 30 and 32 of rotor 28 to direct the meat in chamber 36 out through outlet passageway 38. Wiper blade 42 is biased inwardly by any suitable means so that the blade 42 can follow the contour of lobes 30 and 32 of rotor 28 as it rotates. As best seen in FIGS. 3 and 6, wiper blade 42 is connected to a rod 44 which is in turn connected to an operating rod 46 that is movable inwardly and outwardly against the resistance applied by a vacuum chamber 47 through which rod 46 extends. A spring arrangement could also be used to bias wiper blade 42 inwardly. Thus, when blade 42 engages the rotor 28, it will remain in contact with the rotor surface as the lobe 30 or 32 passes through chamber 36.

To provide for varying the amount of meat fed from chamber 36 into outlet passageway 38, the amount of penetration of wiper blade 42 into chamber 36 can be adjusted by varying the position of rod 46 using the nut 49 threaded on the end of rod 46. With this arrangement, wiper blade 42 can be positioned so as to engage the entire surface of rotor 28 at all times or wiper blade 42 can be withdrawn to a selected position so as to engage only a portion of the surface of rotor 28 as it rotates. This will force a smaller quantity of meat from chamber 36 through outlet passageway 38. Thus, by the simple turning of nut 49 on the rod 46, the quantity of meat can be quickly adjusted to provide for different size sausage links.

In order to remove air from the meat being fed into the chamber 24 and discharged through passageway 38, there is secured to the top of housing 20 a vacuum chamber 48. Chamber 48 is connected through outlet conduit 50 to a vacuum pump (not shown) which will continuously create a low pressure in the chamber 48 at all times that meat is being fed into the chamber 24 of the metering pump. This is accomplished by interconnecting the vacuum chamber 48 to the chamber 24 of the metering pump through a passageway 52 formed in the top of housing 20. Recesses 53 (FIG. 6) in the top surface of rotor 28 provide passageways to facilitate withdrawal of air from chamber 24.

After the ground meat to be stuffed is metered through the metering pump with air removed through vacuum chamber 48, the meat so metered is passed into carrier tube 40 which forms a part of the stuffer indicated generally by the reference numeral 54. It is the function of the stuffer 54 to force the ground meat into a continuous casing which is twisted after the meat is inserted to form links. The stuffing operation will now be described.

The stuffer 54 includes a stuffing horn 58 which is formed with axially extending ribs 60 (FIG. 4) at 90° intervals. Stuffing horn 58 is connected to the discharge end of carrier tube 40 by means of any suitable means such as coupler 62. Carrier tube 40 and stuffing horn 58 are both mounted for rotatable movement in a supporting housing 64 which also encloses a chamber 66 in which there is a chain and sprocket arrangement 68 driven by gear box 14 through a clutch 70 mounted inside of base 10 of the machine. Clutch 70 is intermittently engaged through a control system (not shown) so as to intermittently turn stuffing horn 58 for the purpose described hereinafter.

When the machine is in operation, a length of the thin natural or artificial casing is slipped over the end of the stuffing horn 58 and gathered on the horn 58 until its other free end reaches the discharge end of the stuffing horn 58. The free end of the casing is then tied off by any suitable means. The ribs 60 on the the stuffing horn 58 allow the stuffing horn 58 to grip the casing and also make it easier to slip the casing over the horn 58. As ground meat is metered through outlet duct 42, it will be forced into the casing forcing the casing off the outer end of the stuffing horn 58 as the meat fills the casing. After the time that is predetermined by the control system (or through manual operation), the clutch 70 will be actuated to cause the stuffing horn 58 to turn thereby twisting the casing as the outer end of the now-filled casing is held manually. A link is thus formed. The stuffing horn 58 is turned intermittently at the desired time repeatedly in order to form a continuous series of meat filled links by repeating the foregoing described steps.

The ribs 60 on the stuffing horn 58 allows the casing to be tightly gripped by the horn 58 so that the casing will turn as the horn 58 is turned. The ribs 60 on the stuffing horn 58 also eliminate the necessity of a tapered horn which is expensive to machine.

From the foregoing description, it will be evident that I have provided a semi-automatic meat stuffing machine that is extremely simple and thus can be manufactured at a low cost. In spite of its simplicity and low cost, the machine provides the flexibility necessary for the small meat producer who wishes to produce links of different sizes. As described herein, the metering pump chambers 34 and 36 can effectively be varied by adjusting the position of the wiper blade 42. The ribbed stuffing horn 58 provides an inexpensive alternative to the tapered horn while still solving the casing slipping problem. The design of the metering pump permits a maximum amount of air to be withdrawn from the meat as it is metered and delivered into the casing thus assuring that the maximum amount of air will be removed from the links as they are formed.

Having thus described my invention, it will be obvious to those skilled in the art that various revisions and modifications can be made to the preferred embodiment described herein without departing from the spirit and scope of the invention. It is my intention, however, that all such revisions and modifications as are obvious to those skilled in the art will be included within the scope of the following claims.

I claim:

1. An apparatus for stuffing ground meat from a source into casings so as to form links, said apparatus comprising a housing defining a main chamber, means for connecting the main chamber to a vacuum source, an inlet passageway to said chamber from the meat source, a discharge passageway from said chamber, a stuffing horn connected to the discharge passageway and providing for introduction of the meat into the casing, a rotor rotatably mounted in the main chamber for metering the meat entering from the inlet passageway and passing a predetermined amount of meat through the discharge passageway and into the stuffing horn, adjustable means combined with the rotor and main chamber for selectively varying the amount of meat discharged into the stuffing horn, said adjustable means including a member positionable at a selected predetermined position in which it extends a predetermined distance into the path of the rotor in the main chamber to direct meat into the discharge passageway, resilient means biasing the member to the selected position while providing for movement of the member gradually out of the chamber as it is engaged by the rotor, and power means for driving said apparatus including the rotor.

2. The apparatus of claim 1 in which the rotor has two lobes which define within the main chamber smaller metering chambers, one on each side of the rotor.

3. The apparatus of claim 1 in which the stuffing horn is tubular and is provided with axially-extending ribs spaced around its outer surface, the stuffing horn being of an external size that allows a meat casing to be slipped over the stuffing horn.

4. The apparatus of claim 3 in which means is provided to selectively rotate the stuffing horn thereby provided for twisting of the casing to form links after meat has been introduced into the casing.

5. An apparatus for stuffing ground meat from a source into casings so as to form links, said apparatus comprising a housing having walls defining a main chamber, means for connecting the main chamber to a vacuum source, an inlet passageway to said chamber from the meat source, a discharge passageway from said chamber, a stuffing horn connected to the discharge passageway and providing for introduction of the meat into the casing, a rotor rotatably mounted in the main chamber for metering the meat entering from the inlet passageway and passing a predetermined amount of the meat through the discharge passageway and into the stuffing horn, the rotor having two lobes which define within the main chamber smaller metering chambers, one lobe being on each side of the rotor and having a pocket formed in the surface engagable with the walls of the main chamber, each pocket trapping excess air in the meat as it is compacted during rotation of the rotor, adjustable means combined with the rotor and the main chamber for selectively varying the amount of meat discharged into the stuffing horn, and power means for driving said apparatus including the rotor.

6. The apparatus of claim 5 in which the adjustable means includes a wiper blade that extends into the main chamber and is engageable with the rotor as it rotates, and means to bias the wiper blade inwardly while allowing it to be moved outwardly from the chamber as it engages the rotor.

7. The apparatus of claim 6 in which means is provided to limit the amount of inward penetration of the wiper blade into the main chamber thereby providing for varying the amount of meat discharged from the metering chamber as the rotor rotates.

8. The apparatus of claim 5 in which the upper surface of the rotor is provided with a recess which communicates with the means connecting the main chamber to a vacuum source.

* * * * *